United States Patent
Albers, Jr.

(10) Patent No.: US 6,776,124 B1
(45) Date of Patent: Aug. 17, 2004

(54) DOUBLE-RELEASE BAR FOR A COW STANCHION APPARATUS

(76) Inventor: Teo Albers, Jr., 6241 Joaquin St., Chino, CA (US) 91710

( * ) Notice: Subject to any disclaimer, the term of this patent is extended or adjusted under 35 U.S.C. 154(b) by 0 days.

(21) Appl. No.: 10/361,134

(22) Filed: Feb. 6, 2003

(51) Int. Cl.⁷ .............................................. A01K 27/00
(52) U.S. Cl. ...................................................... 119/792
(58) Field of Search ................ 119/740, 741, 119/738, 739, 750

(56) References Cited

U.S. PATENT DOCUMENTS

| | | | |
|---|---|---|---|
| 4,037,566 A | | 7/1977 | Albers |
| 4,051,813 A | | 10/1977 | Albers |
| 4,185,592 A | | 1/1980 | Albers, Sr. |
| 4,377,131 A | * | 3/1983 | Vandenberg et al. ........ 119/148 |
| 4,476,815 A | | 10/1984 | Albers, Sr. |
| 4,495,897 A | | 1/1985 | Albers, Sr. |
| 4,867,105 A | * | 9/1989 | Hatfield ........................ 119/148 |
| 4,930,452 A | | 6/1990 | DaSilveira |
| 5,309,869 A | | 5/1994 | Albers, Jr. |
| 5,694,887 A | * | 12/1997 | Vandenberg ................. 119/740 |
| 6,273,028 B1 | * | 8/2001 | Vandenberg ................. 119/740 |
| 6,352,052 B1 | * | 3/2002 | Albers, Jr. ................... 119/524 |

FOREIGN PATENT DOCUMENTS

DE          4041882 A1  *  2/1992  ............ A01K/1/06

* cited by examiner

Primary Examiner—Peter M. Poon
Assistant Examiner—Bethany L. Griles
(74) Attorney, Agent, or Firm—Fulwider Patton Lee & Utecht, LLP

(57) ABSTRACT

Cow stanchion apparatus having a fixed support structure that carries a plurality of pairs of like double release stanchion bars which simultaneously swing towards and away from one another to control movement of cattle relative to such apparatus.

10 Claims, 7 Drawing Sheets

DOUBLE-RELEASE BAR FOR A COW STANCHION APPARATUS

BACKGROUND OF THE INVENTION

The present invention relates to cattle stanchion apparatus and more particularly to an improved cattle stanchion apparatus utilizing double-release stanchion bars. Prior cattle stanchion apparatus have utilized single release stanchion bars for controlling movement of cattle in and out of such stanchion apparatus. Examples of such prior cattle stanchion apparatus are shown in Albers U.S. Pat. Nos. 4,037,566; 4,051,813; 4,185,592; 4,476,815; and 4,495,897. See also Hatfield U.S. Pat. No. 4,867,105 and DaSilveira U.S. Pat. No. 4,930,452.

SUMMARY OF THE INVENTION

The improved cattle stanchion apparatus of the present invention utilizes a plurality of pairs of like pivoted release stanchion bars in place of the pivoted single release stanchion bars employed in prior art cattle stanchion apparatus. The double-release stanchion bar arrangement of the present invention permits a shorter travel of the release stanchion bars for locking up the cattle, provides a more positive locking up of the cattle, requires half the effort to lock up the cattle, provides a wider opening for the cattle, and allows bulls to enter the stanchion apparatus, rather than solely cows. Additionally, the cattle stanchion apparatus of the present invention allows for greater cow comfort, and applies less stress to the cows, resulting in increased milk production.

Other objects and advantages of the present invention will become apparent from consideration of the following detailed description taken in conjunction with the accompanying drawings.

DETAILED DESCRIPTION OF A PREFERRED EMBODIMENT

Referring to the drawings, there is shown a double-release cattle stanchion bar apparatus embodying the present invention. Such apparatus includes a fixed support structure S, which includes top and bottom rails 32 and 34 respectively, shown fixed to an end post 36 and a plurality of intermediate posts 37. A plurality of double release stanchion bar assemblies A are spaced along the length of the top and bottom rails. Each assembly includes a pair of stanchion release bars 40, 42 of like construction and mirror images of one another. The intermediate portions of each stanchion release bar is pivotally connected to the intermediate portion of a fixed release stanchion carrier bar 44, 46. The intermediate portions of the fixed release stanchion carrier bars extend out of the vertical position towards one another. With this arrangement, the stanchion release bars 40, 42 can swing simultaneously towards and away from one another in accordance with the operation of a release stanchion control mechanism C that includes a latch bracket L secured to the upper end of each stanchion release bar, a horizontal positioner rod R rotatably carried by the top rail 32, and a plurality of latch heads H secured to the top rail 32 intermediate the stanchion release bar assemblies A. It should be understood that the space between the stanchion release bars 40, 42 defines a cattle head-receiving opening O.

More particularly, the end posts 36 and intermediate posts 37 are securely attached at their lower ends to a support surface 47. Straps 49 connect the top and bottom rails to the posts. Auxiliary posts 50 are rigidly affixed as by welding outwardly of each release stanchion carrier bar 44, 45. The intermediate portion of the stanchion release bars are pivotally attached to the intermediate portion of its respective stanchion release carrier bar 44, 46 by a U-shaped bracket 52 having its bifurcated ends connected by a pivot bolt 54. The upper end of each stanchion release bar 40, 42 includes a latch bracket LH of bifurcated construction as shown particularly in FIGS. 8 and 9. A horizontal latch pin 55 extends between the bifurcated upper ends of each locking bracket L, while a second horizontal stop pin 57 extends below the sides of each bracket below top rail 32. Stop pin 57 includes a coating of sound deadening material such as rubber or nylon 57a. This arrangement permits the latch brackets L, and accordingly the stanchion release bars 40, 42 to freely pivot along the top rail 32 during certain operations of the cattle stanchion apparatus of the present invention.

Figure 8:
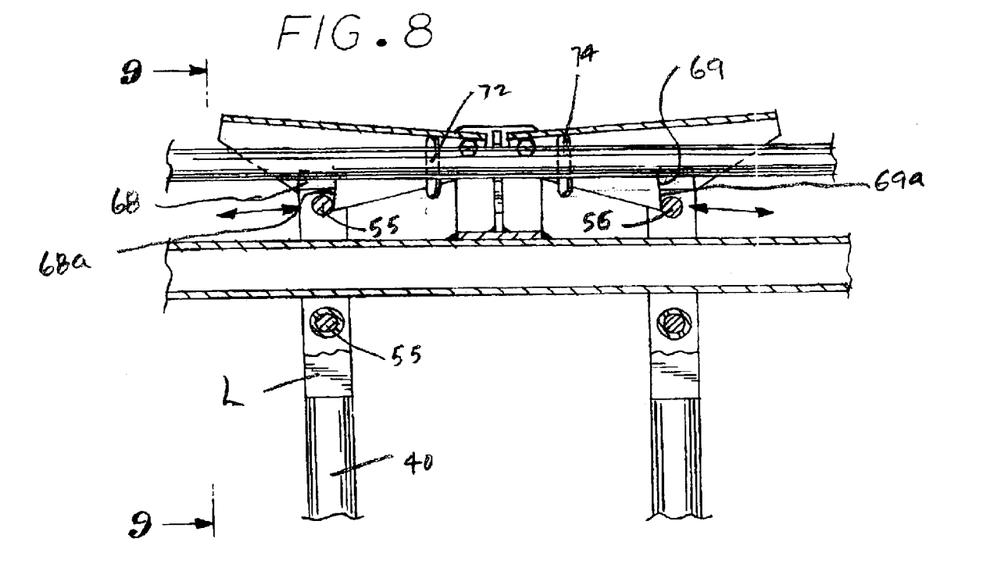
Figures 9, 10, 11:
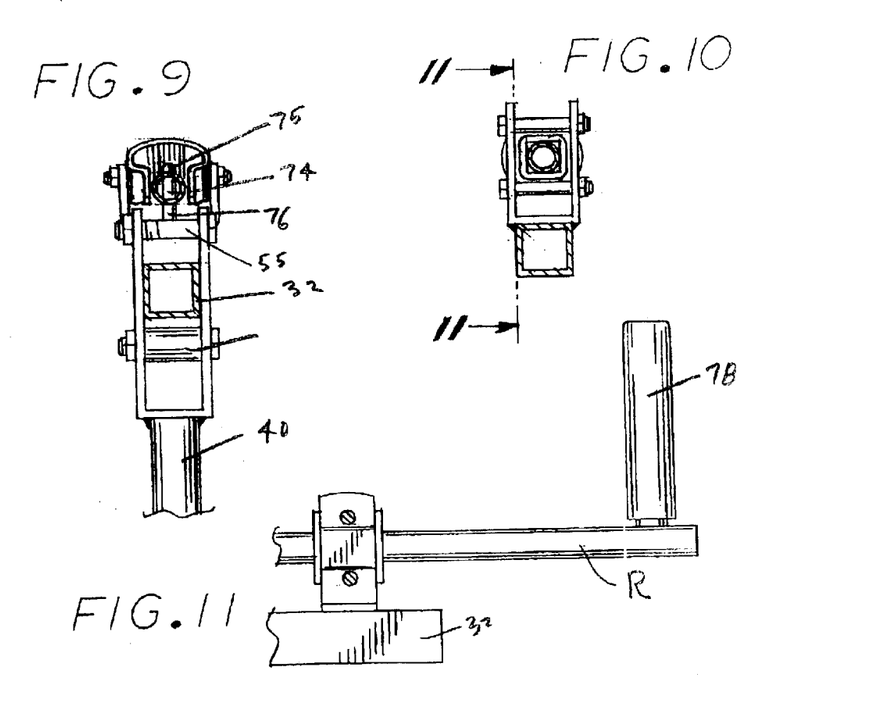
FIG. 9 is a vertical sectional view taken along line 9—9 of FIG. 8.
FIG. 10 is a vertical sectional view taken in enlarged scale along line 10—10 of FIG. 7.
FIG. 11 is a broken vertical sectional view taken in further enlarged scale along line 11—11 of FIG. 10.
Figure 12:
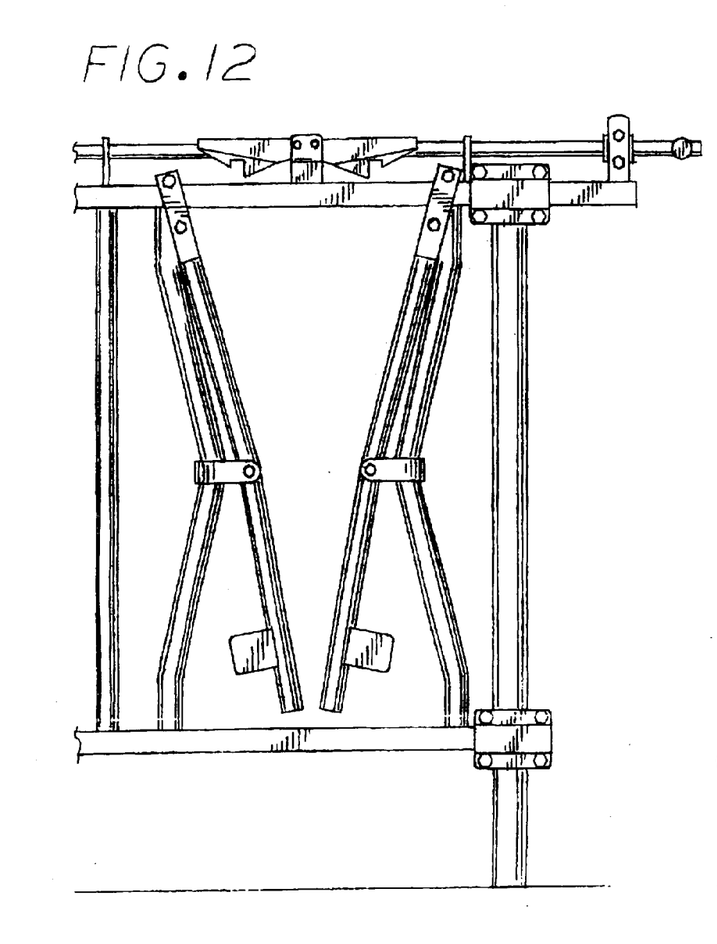
FIGS. 12 and 13 are partial front elevational views of the apparatus of FIG. 1 showing the stanchion release bars in a locked position and in an unlocked position, respectively.
Figure 13:
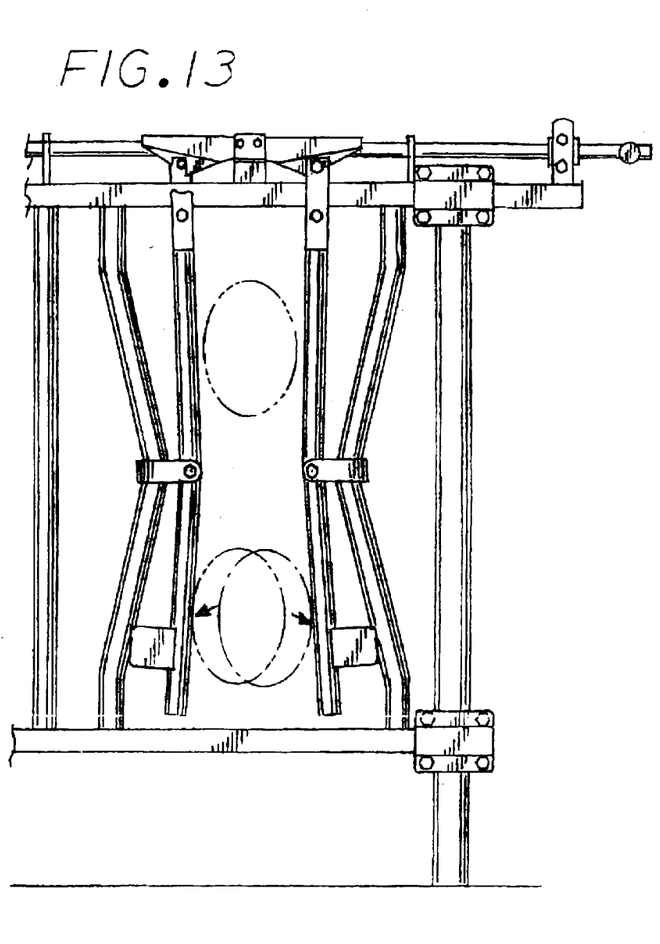
Figure 14:
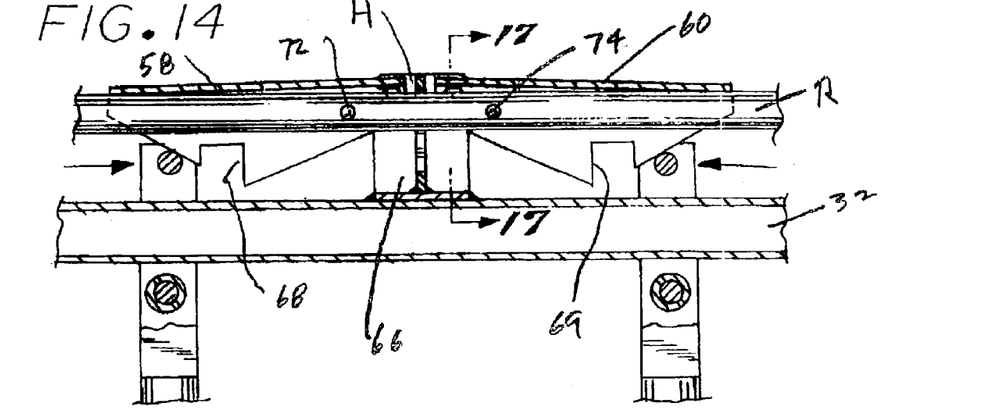
FIGS. 14, 15 and 16 show the operation of the release stanchion bars latching means employed in the cattle stanchion apparatus of the present invention.
Figure 15:
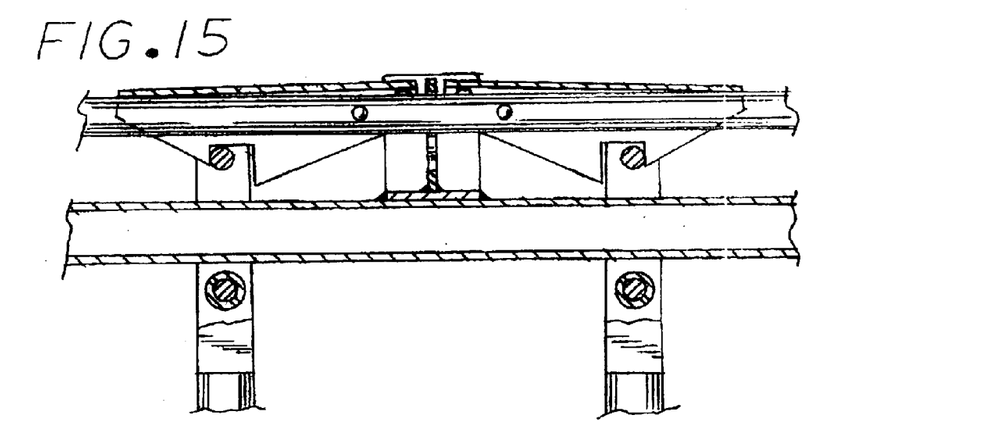
Figure 16:
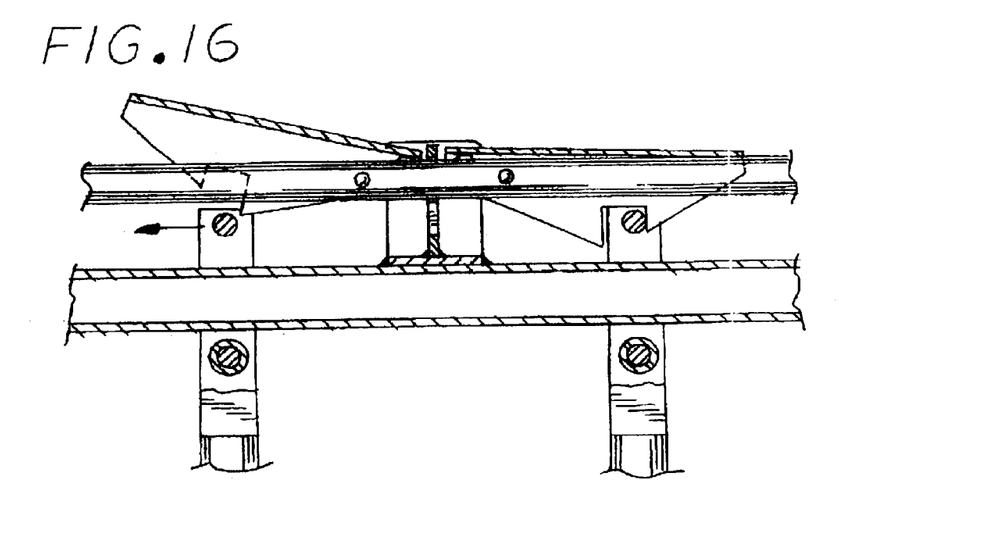
Figure 17:
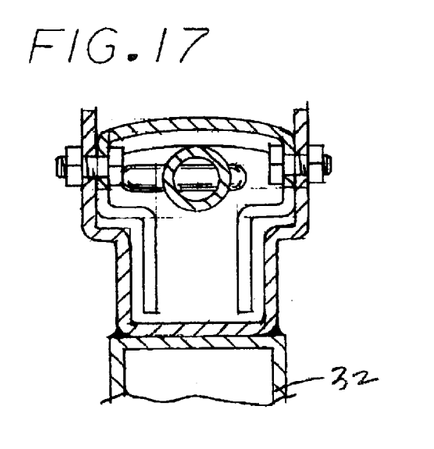
FIG. 17 is a vertical sectional view taken in enlarged scale along line 17—17 of FIG. 14.
Figure 18:
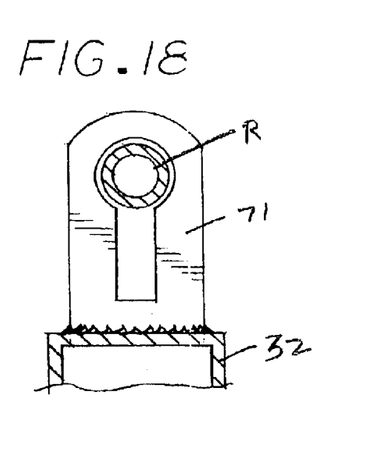
FIG. 18 is a vertical sectional view taken along line 18—18 of FIG. 1.
Figure 19:
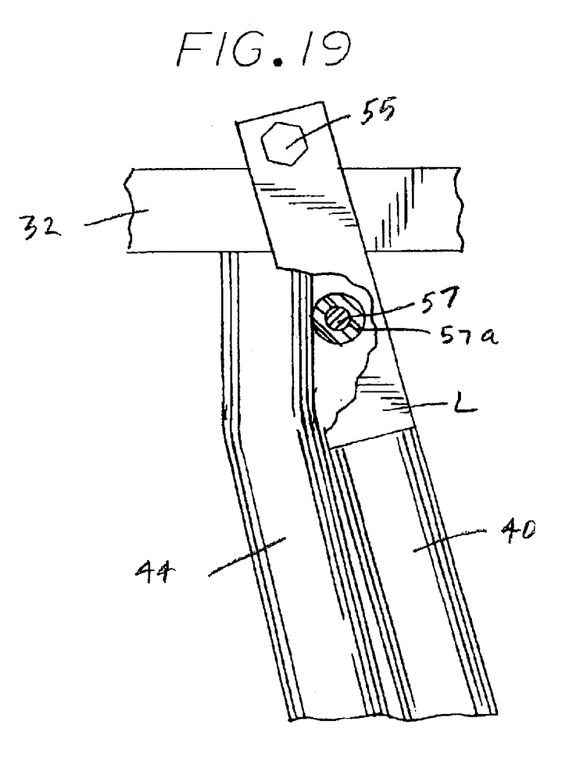
FIG. 19 is a broken front elevational view of the upper end of a release stanchion bar showing a noise deadening feature of the cattle stanchion apparatus of the present invention.
Figure 20:
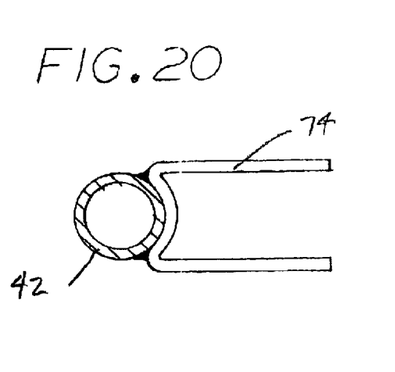
FIG. 20 is a cross sectional view taken in enlarged scale along line 20—20 of FIG. 1.

As shown particularly in FIGS. 2, 3, 4 and 17, each latch head LH includes a pair of mirror-image flaps 58 and 60 pivotally connected at their proximate ends by pivot bolts 62 and 64 to a bifurcated support strap 66 having its lower end affixed as by welding to the top rail 32 above the mid-section of the stanchion release bar assemblies A. The lower ends of each latch head flap 58 and 60 are formed with an upwardly extending slot 68, 69, which selectively receive the latch pins 55, 56 of the latch brackets L. As shown particularly in FIG. 8, the proximate sides of slots 68, 69 extend below the remote sides of the slots to define an abutment surface 68*a* and 69*a*. The flaps 58 and 60 of the latch heads pivot between a lower latched position and a raised unlatched position under the control of horizontal positioner rod R which is rotationally carried by a main end support bearing 70 and intermediate spacer bearings 71 attached at their lower ends to the upper surface of the top rail 32. The positioner rod R is provided with pairs of flap lifting pins 72, 74 in vertical alignment with the intermediate portion of each of the flaps. As shown in FIGS. 8, 9, and 17, each lifting pin includes a major length 75 and a minor length 76. It should be noted that the stanchion release bars 40, 42 are provided at their lower ends with weights 78 that automatically bias such bars to their spaced-together locked position of FIG. 13.

Figure 1:
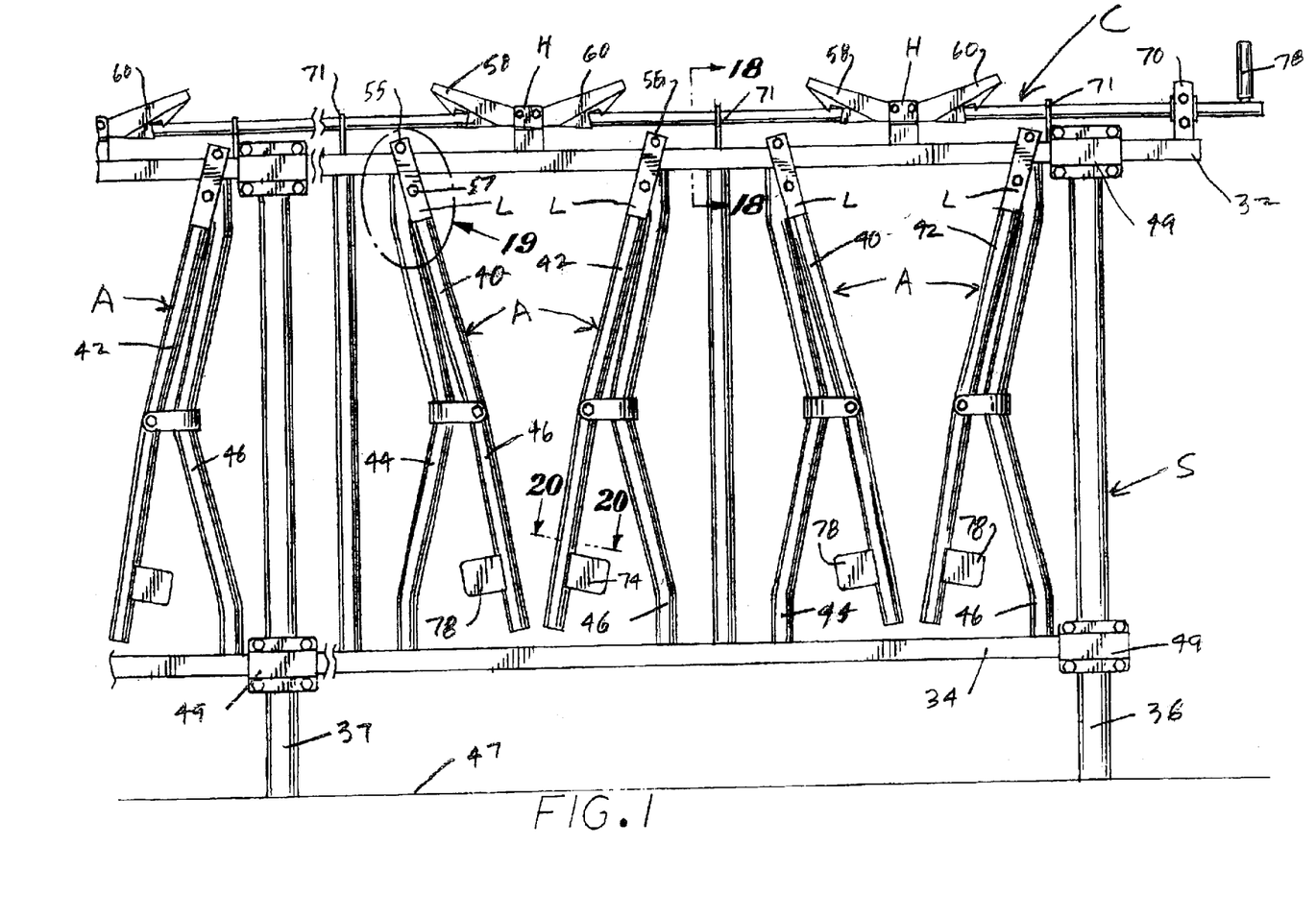
FIG. 1 is a front elevational view of a double-release cattle stanchion bar apparatus of the present invention showing the release stanchion bars thereof ready to move into a cattle feeding position.
Figures 2, 3, 4, 5:
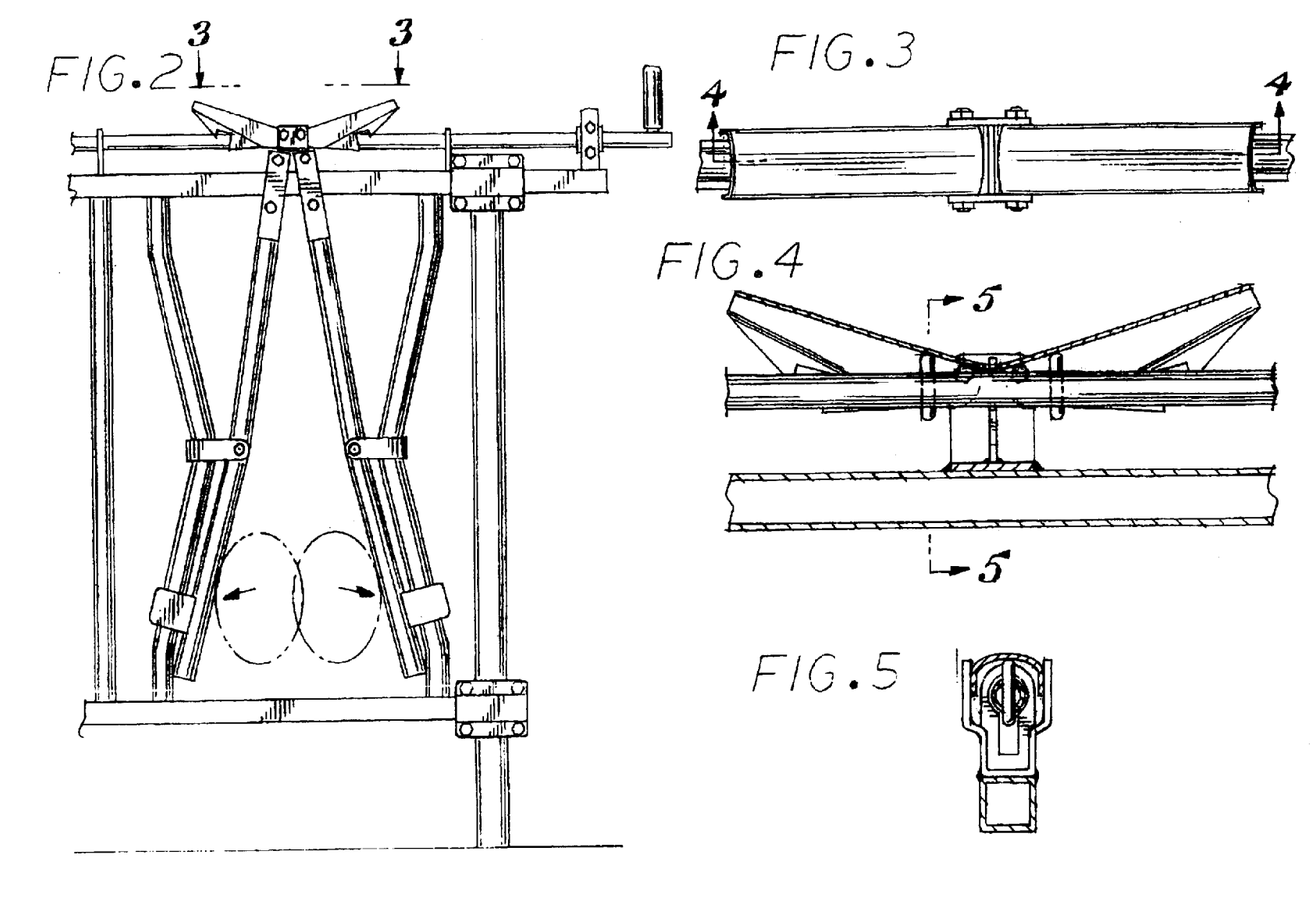
FIG. 2 is a broken front elevational view of the apparatus of FIG. 1 showing the release stanchion bars in a cattle feeding position.
FIG. 3 is a top plan view taken in enlarged scale along line 3—3 of FIG. 2.
FIG. 4 is a vertical sectional view taken in further enlarged scale along line 4—4 of FIG. 3.
FIG. 5 is a vertical sectional view taken along line 5—5 of FIG. 4.
Figure 6:
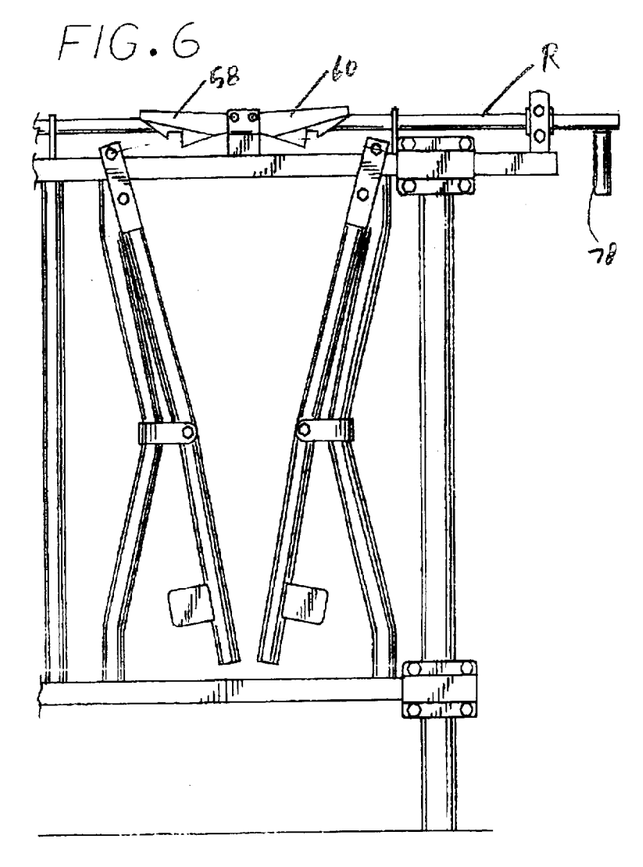
FIGS. 6, 7 and 8 are a partial front elevational views showing the parts of the cattle stanchion apparatus arranged to permit training of younger cows.
Figure 7:
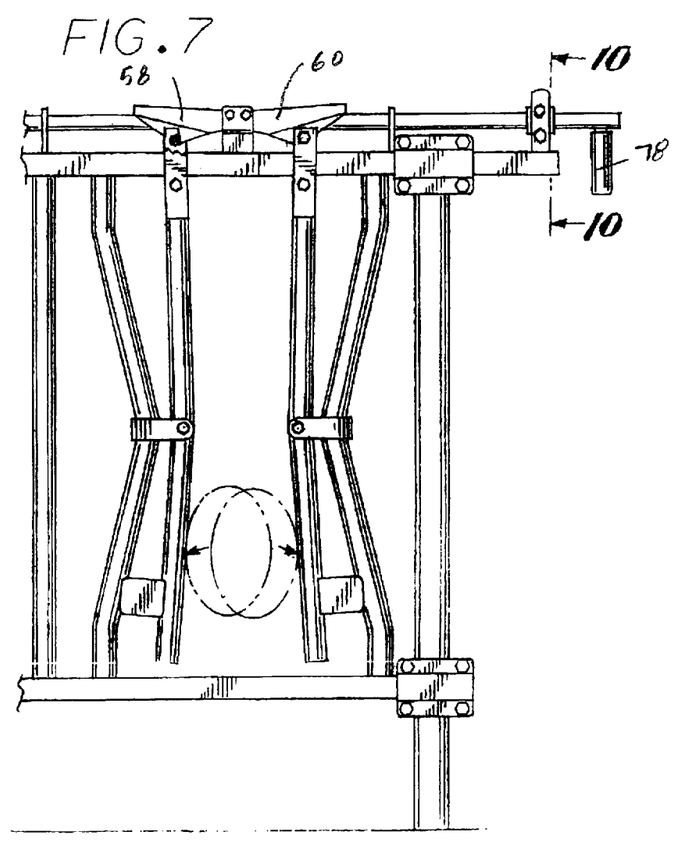

In the operation of the aforedescribed cattle stanchion apparatus, in FIG. 1 the parts thereof are shown in a cattle feeding position where cattle (not shown) are free to move into and out of each head-receiving opening O. At this time the latch brackets L can slide along the top rail 32 since the flap lifting pins 72, 74 are arranged vertically out of the path of the latch pins 55, 56 of the latch brackets. This results from the fact that the positioner rod R is disposed in its position of FIGS. 1, 4, and 5 wherein the flap lifting pins 72, 74 extend upwardly, in which position such pins have lifted the free ends of the flaps out of the path of the latch pins 55, 56. The cattle can then insert their heads into the upper portion of the opening O and move their heads downwardly to a feeding position as the upper ends of the stanchion release bars 40, 42 swing simultaneously towards one another under the pressure applied by the cattle's neck, as indicated in dotted outline in FIG. 2.

It has been found that the use of two stanchion release bars, rather than a single stanchion release bar provides a wider space between the lower position of the bars providing increased cow comfort during feeding. Should a cattle fall there is a reduced chance of choking because of such wider space. The wider space can accept the neck of a bull. Also, it requires less effort for the cattle to urge the double stanchion release bars apart than to effect swinging of a single stanchion bar.

Referring now to FIGS. 6–9, positioner rod R has been rotated by handle 78 to dispose lifting pins 72, 74 with their minor lengths 76 pointed downwardly. As shown in FIG. 8, the upper ends of the stanchion release bars 40, 42 can swing towards one another until latch pins 55, 56 engage abutment surface 68*a*, 66*a* of flaps 58 and 60. Such abutment prevents the stanchion release bars' lower portions from swinging into a normal wide cattle feeding position, since a cattle's head is blocked from extending into such opening, as indicated in dotted outline in FIG. 7. This position of the stanchion release bars permit the training of cattle in using the cattle stanchion apparatus.

Referring now to FIGS. 12–15, when the positioner rod R is rotated to a horizontal position, the lifting pins 72, 74 are moved away from the flaps 58, 60 permitting such flaps to pivot downwardly to their lower positions. Accordingly, when weights 78 cause the upper portion of the stanchion release bars to automatically swing towards one another from their position of FIG. 12 to that of FIG. 13, the latch pins 55, 56 will snap into flap slots 68, 69 thereby locking such bars into a cattle locked-in or locked-out position. When an operator wishes to return the stanchion release bars 40, 42 to a cattle release position he can return positioner rod R to its position where lifting pins 72, 74 extend upwardly to raise the flaps 58, 60 and thereby free the latch pins from slots 68 and 69.

It is also possible for the operator to manually raise individual flaps 58, 60 to release an individual cattle, as for example, a downed cow.

Various modifications and changes can be made with respect to the foregoing detailed description without departing from the scope of the following claims.

I claim:

1. Cow stanchion apparatus for controlling movement of cows relative to cow feed positioned adjacent such apparatus, said cow stanchion apparatus comprising:

a fixed support structure;

a plurality of release stanchion bar assemblies supported by the fixed support structure along the length of the fixed support structure;

each release stanchion assembly including a pair of like, facing double release stanchion bars pivotally connected at their intermediate portions to the fixed support structure for simultaneous free swinging movement towards and away from one another when engaged by the neck of a feeding cow, with the space between the release stanchion bars defining a cow head receiving opening and the release stanchion bars being pivotable between a cow locking position wherein the release stanchion bars extend generally vertically and parallel to one another and a cow feeding position wherein the stanchion release bars are free to swing towards and away from one another the width of the cow head receiving opening by engagement of the neck of a feeding cow as she moves her head to reach her feed; and a release stanchion bar control assembly interposed between the fixed support structure and the release stanchion bars to control the swinging movement of such release stanchion bars.

2. Cow stanchion apparatus as set forth in claim 1, wherein the stanchion release bars are biased to automatically assume a position in which the upper ends of such bars are spaced apart.

3. Cow stanchion apparatus as set forth in claim 1, wherein the lower portion of the stanchion release bars are weighted to cause such bars to automatically assume a position wherein the upper ends of such bars are spaced apart.

4. Cow stanchion apparatus for controlling movement of cows relative to cow feed positioned adjacent such apparatus, said cow stanchion apparatus comprising:

a fixed support structure;

a plurality of release stanchion bar assemblies supported by the fixed support structure along the length of the fixed support structure;

each release stanchion assembly including a pair of like, facing double release stanchion bars pivotally connected at their intermediate portions to the fixed support structure for simultaneous free swinging movement towards and away from one another when engaged by the neck of a feeding cow, with the space between the release stanchion bars defining a cow head receiving opening and the release stanchion bars being pivotable between a cow locking position wherein the release stanchion bars extend generally vertically and parallel to one another and a cow feeding position wherein the stanchion release bars are free to swing towards and away from one another the width of the cow head receiving opening by engagement of the neck of a feeding cow as she moves her head to reach her feed; and a release stanchion bar control assembly interposed between the fixed structure and the stanchion release bars to control the swinging movement of such bars, such control means including a latch bracket on the upper portion of each stanchion release bar, latch heads on the fixed structure, each latch head being disposed above the mid-section of each of the release stanchion assemblies, a pair of flaps being pivotally supported by each latch head, each of the flaps being formed with an abutment surface and a lock slot, and a positioner rod horizontally carried by the fixed structure and having flap lifting pins engageable with abutment surfaces and lock slots of the flaps to raise and lower the flaps with the latch pins of the stanchion release bars being moveable into and out of engagement with the flap abutment surfaces and the lock slots to control the swinging movement of the stanchion release bars.

5. Cow stanchion apparatus as set forth in claim 4, wherein the stanchion release bars are biased to automatically assume a position in which the upper ends of such bars are spaced apart.

6. Cattle stanchion apparatus as set forth in claim 4, wherein the lower portion of the stanchion release bars are weighted to cause such bars to automatically assume a position wherein the upper ends of such bars are spaced apart.

7. Cow stanchion apparatus for controlling movement of cows relative to cow feed positioned adjacent such apparatus, said cow stanchion apparatus comprising:

a fixed support structure that includes a top rail, a bottom rail and a plurality of pairs of release stanchion carrier bars extending between the top and bottom rails along the length of the fixed support structure;

a plurality of release stanchion bar assemblies supported by the release stanchion carrier bars;

each release stanchion bar assembly including a pair of like, facing double release stanchion bars pivotally connected at their intermediate portions to a pair of the release stanchion carrier bars for simultaneous free swinging movement towards and away from one another to an open position when engaged by the neck of a feeding cow, with the space between the release stanchion bars defining a cow head receiving opening and the release stanchion bars being pivotable between a cow training position wherein the lower portion of the stanchion release bars are secured against swinging to an open position, a cow locking position wherein the release stanchion bars extend generally vertically and parallel to one another and a cow feeding position wherein the stanchion release bars are free to swing towards and away from one another the width of the cow head receiving opening by engagement of the neck of a feeding cow as she moves her head to reach her feed; and a release stanchion bar control assembly interposed between the fixed support structure and the release stanchion bars to control the swinging movement of such bars.

8. Cow stanchion apparatus as set forth in in claim 7, wherein the release stanchion control assembly includes a latch bracket on the upper portion of each stanchion release bar, each having a latch pin at its upper end, latch heads on the top rail, each latch head being disposed above the mid-section of each of the release stanchion assemblies, a pair of flaps pivotally supported by each latch head, each of the flaps being formed with an abutment surface and a lock slot, and a positioner rod horizontally rotatably carried by the top rail and having flap lifting pins engageable with the abutment surfaces and lock slots to raise and lower the flaps, with the latch pins of the of the stanchion release bars being moveable into and out of engagement with the flap abutment surfaces and the lock slots to control the swinging movement of the stanchion release bars, with engagement of the latch pins with the abutment surfaces preventing the lower portions of the stanchion release bars from swinging into an open cow feeding position, engagement of the latch pins with the lock slots locking the stanchion release bars in a generally vertical position, and disengagement of the latch pins with the lock slots permitting the stanchion release bars to swing into a cow feeding position.

9. Cow stanchion apparatus as set forth in claim 7, wherein the stanchion release bars are biased to automatically assume a position in which the upper ends of such bars are spaced apart.

10. Cattle stanchion apparatus as set forth in claim 7, wherein the lower portion of the stanchion release bars are weighted to cause such bars to automatically assume a position wherein the upper ends of such bars are spaced apart.

* * * * *